(No Model.)
J. T. BRAYTON.
INSTRUMENT FOR MEASURING CURVATURE OF LENSES.
No. 548,291.　　　　　　　Patented Oct. 22, 1895.
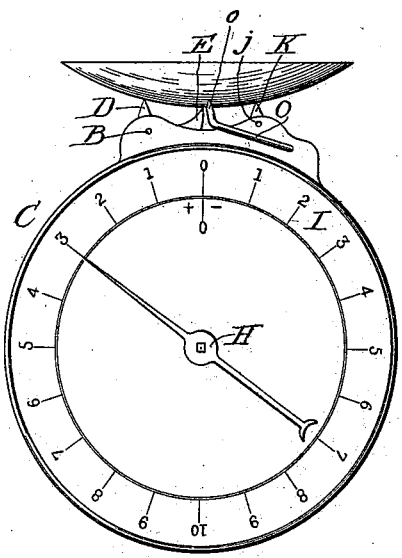
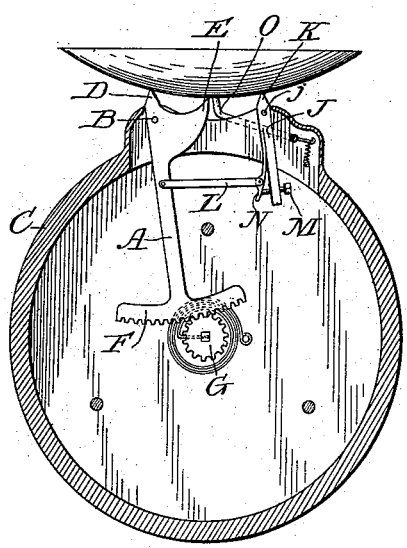
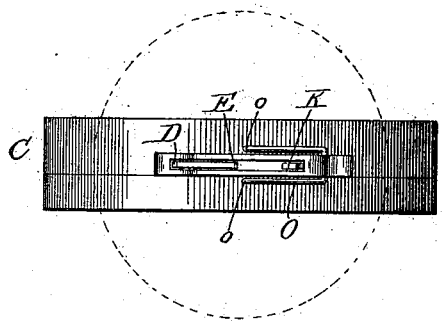
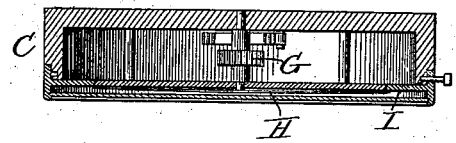
Witnesses:
Wm. M. Rheem.
Wm. F. Henning.
Inventor:
James T. Brayton
By Raymond & Veeder
Attys (No Model.) 2 Sheets—Sheet 2.
J. T. BRAYTON.
INSTRUMENT FOR MEASURING CURVATURE OF LENSES.
No. 548,291. Patented Oct. 22, 1895.
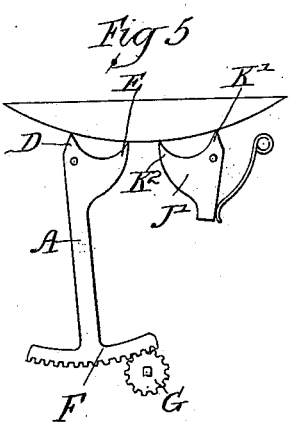
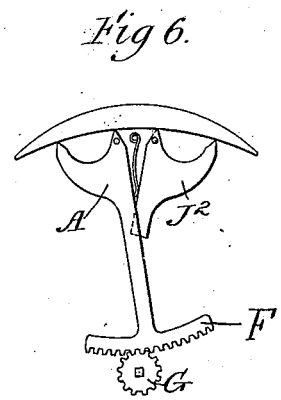
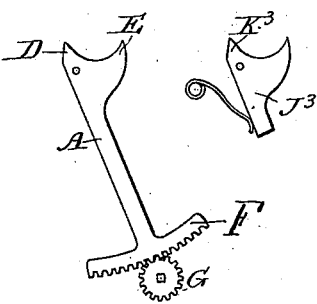
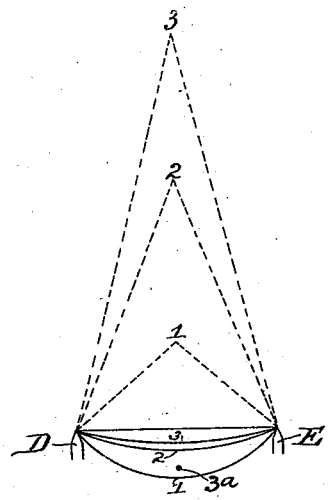
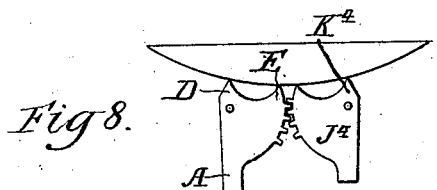

UNITED STATES PATENT OFFICE.

JAMES T. BRAYTON, OF CHICAGO, ILLINOIS, ASSIGNOR TO THE GENEVA OPTICAL COMPANY, OF SAME PLACE.

INSTRUMENT FOR MEASURING CURVATURE OF LENSES.

SPECIFICATION forming part of Letters Patent No. 548,291, dated October 22, 1895.

Application filed April 25, 1892. Serial No. 430,448. (No model.)

*To all whom it may concern:*

Be it known that I, JAMES T. BRAYTON, a citizen of the United States, residing in Chicago, in the county of Cook and State of Illinois, have invented certain new and useful Improvements in Curve-Measuring Instruments, of which the following is a specification, reference being had to the accompanying drawings.

The instrument herein shown and described is intended chiefly for the measurement of the focal distance of lenses, such focal distance depending upon the curvature of the lens; but it is also applicable to the determination of like curvatures in any other bodies, properly graduated scales being provided.

Among the purposes intended to be fulfilled by the present invention may be named, first, the provision of means, whereby the lens or other object whose curvature is to be measured may be held in the correct position therefor without the exercise of special skill by the user, and, second, the provision of such connections between the contact-points through which the measurements are made and the indicating devices as shall enable a scale of equal graduations to show correctly the curvature of focal length of the object measured. Other improvements in details are made, as hereinafter described and claimed.

In the accompanying drawings, Figure 1 is an elevation of my improved instrument. Fig. 2 shows the same with the case removed, so as to expose the interior mechanism. Fig. 3 is an edge view of the instrument; Fig. 4, a horizontal section of the same. Figs. 5, 6, 7, and 8 show different arrangements of the contact-points and the levers which carry them, and Fig. 9 is a diagram illustrating the operation of the instrument.

A, Fig. 2, is a lever pivoted at B to the casing C. The end which projects from the casing is provided with two contact-points D E, and its inner end is provided with a segmental toothed gear F. Said gear F meshes in a pinion G, to which is connected a pointer H, Fig. 1. Said pointer moves over a dial I, which is graduated in the case illustrated to show the focal length in diopters of the lens. Pivoted to the case C is a second lever J, having, as illustrated in Fig. 2, the contact-point K. It may also, as hereinafter explained with reference to the succeeding Figs. 5, 6, 7, and 8, be made with more than one point. When made with a single contact-point, as shown in Fig. 2, it is connected by the link L to the lever A, so that the two levers move together. The distance from each other of the contact-points D and K may be varied by means of the screw M in the lever J, which acts upon the spring-arm N of the lever J. Said spring-arm carries the pivot by which the link L is connected to the lever. It will be understood without detailed explanation that the contact-points D, E, and K, together with the indicating devices connected thereto, will measure the curvature of any object placed against the points, and consequently may be made to indicate the focal length of the lens; but in order to have the indications of the device accurate it is necessary to hold the lens so that its surface against the contact-points will be normal to the plane in which they lie.

In order to secure the proper position of the lens, I provide a forked lever O, Fig. 3, the upwardly-bent ends *o o* of which form bearings upon which the lens may rest when it is applied to the contact-points D E K. The lever O being pivoted in the case C and having the two arms of the fork of equal length, the movements of the bearing-points *o o* are alike. The lens is thus prevented from tilting and is properly presented to the contact-points D E K.

It will be seen that in instruments operating by means of contact-points applied to the curve to be measured the motion imparted to the contact-points and the indicating devices connected thereto is proportional to the departure of the arc included between the contact-points from a straight line joining the outermost of said points. As will be seen from a diagram shown in Fig. 9, the distance of the arc of the curve measured from the chord joining the extremities of said arc increases more rapidly than the radius from which said arc is struck diminishes. Thus if the radius of the arc 2, struck from the center 2, be double that of the arc 1, struck from the center 1, the arc 1 will be more than twice as far from the chord joining the outer contact-points D E than is arc 2. So if the radius of arc 1 is one-third of the radius of arc 3 its distance from their common chord joining the points D E will be more than three times as great as that of arc 3. Three times this latter distance is marked by the point 3ª, Fig. 9, and the difference is easily seen by reference to this figure. It becomes necessary, therefore, where exact measurements are desired to provide an unevenly-spaced scale to indicate the curvature unless some compensating device be employed to correct the error resulting from using a scale having equal gradations. As it is desirable to have the gradations in the scale equal, I provide compensating devices by which the outer contact-points will approach each other as the curvature to be measured increases. The bringing of the contact-points nearer to each other causes a shorter arc of the curve to be included between the measuring-points and compensates for the error above referred to. Various means may be employed for diminishing the distance between said contact-points as the curve to be measured is increased.

In Figs. 1, 2, and 3 the means employed consists in making the pivotal point of the lever A farther from the contact-point D than is the pivotal joint $j$ of the lever J from the contact-point K. The result will be that as the convexity of the lens applied to the contact-points is increased the point D will move farther to the right than will the point K, and the distance between them will be thus diminished. To compensate for the increased curvature of a concave lens, an opposite proportion would be observed for the projecting ends of the levers A and J—that is, the contact-point D should project less than the contact-point K. Another mode of accomplishing this same purpose is shown in Fig. 5, in which the lever J' is not connected to the lever A, but is provided with an additional contact-point $K^2$, which causes the outer contact-point K' to approach the contact-point D as the curvature of the lens to be measured increases.

Fig. 6 shows a similar arrangement to that of Fig. 5, which, however, is adapted to a concave lens.

Fig. 7 shows still another arrangement of what are essentially the same levers as those shown in Figs. 5 and 6. The pivotal points of both levers are upon the same side relatively to the contact-points, so that the action is a differential one instead of an accumulative one, as in Figs. 5 and 6. In this respect its action resembles that of the lever shown in Fig. 2. The forms shown in Figs. 2 and 7 are suitable where but a small compensation is needed, as where the radii of the curves to be measured are large in comparison to the distance by which the parts are separated. The points shown in Figs. 5 and 6 are suitable for the correction of larger errors where the radii of the curves to be measured are smaller in proportion to the distance separating the contact-points.

Fig. 8 shows how the two levers A and $J^4$, arranged as illustrated in Fig. 5, are connected together, and thus both connected to a single indicating mechanism. The reading of the indicating mechanism, of course, is the same, whether one or both levers are connected. The means by which both levers are connected to each other and to the single indicating mechanism consists in teeth cut in the adjacent edges of the levers A and $J^4$, which mesh with each other. Other modes of connection will readily suggest themselves to the skilled mechanic and can be adapted to the other levers shown.

In addition to providing facilities for varying in any desired ratio the distance between the contact-points, the use of two levers, such as are illustrated in Figs. 5 and 7, renders the exact shaping of the contact-points less important, as they are always presented in substantially the same relation to the surface to be measured, whether that surface is a curve of large or small radius. It is obvious that still other variations in the manner of pivoting, connecting, and arranging the levers carrying the contact-points may be used; but the instances herein given are sufficient to illustrate my invention.

Without confining myself to the precise construction herein shown and described, I claim—

1. The combination in a curve measuring instrument having contact points and an indicating mechanism by which their relative positions are shown, of movable bearings by which a normal position of the object to be measured with relation to said points is secured, substantially as described.

2. The combination, in an instrument for measuring curves by means of a series of points; an indicating mechanism connected to one or more of said points; and a forked lever whose ends form bearings for the object to be measured, substantially as described.

3. The combination in a curve measuring instrument of two pivoted levers having one or more contact points; means for adjustably connecting said levers; and indicating mechanism operated by the movement of said levers.

JAMES T. BRAYTON.

Witnesses:
IRWIN VEEDER,
TODD MASON.